Nov. 22, 1927.  1,650,486
D. BOURQUE
SEPARABLE FASTENER AND CONSTRUCTION EQUIPPED THEREWITH
Filed Jan. 26, 1923
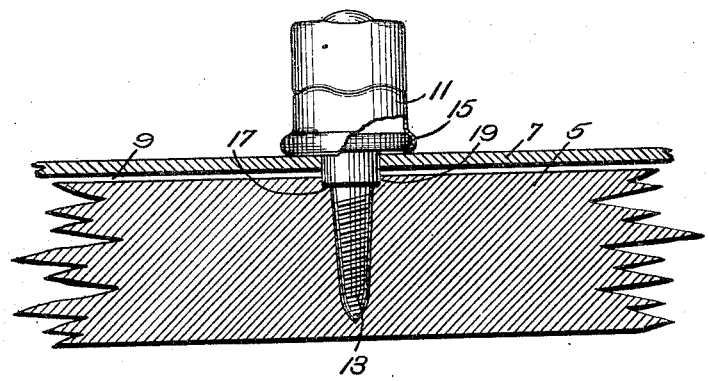
Inventor:
David Bourque
by Emery, Booth, Janney & Varney
Attys.

Patented Nov. 22, 1927.

1,650,486

UNITED STATES PATENT OFFICE.

DAVID BOURQUE, OF AMESBURY, MASSACHUSETTS, ASSIGNOR TO G. W. J. MURPHY COMPANY, OF AMESBURY, MASSACHUSETTS, A CORPORATION OF MASSACHUSETTS.

SEPARABLE FASTENER AND CONSTRUCTION EQUIPPED THEREWITH.

Application filed January 26, 1923. Serial No. 615,059.

This invention relates to separable fasteners and to constructions equipped with the same and the particular purpose is to provide an article which comprises a thin covering or skin of sheet material to which another element is to be secured by means of separable fasteners with a proper equipment of fastener elements. Thus separable fasteners find a wide field in the fastening of curtains to automobile bodies and these bodies are frequently constructed of a wooden frame-work covered with relatively thin sheet metal. My invention provides a form of fastener element such as a turnbutton which may be applied to such bodies with superior results.

My invention will best be understood by the following description of an illustrative embodiment thereof taken in connection with the accompanying drawing which represents a section through a portion of an automobile body with a turnbutton fastener element applied thereto, said element being partly broken away.

Referring to the drawing I have there illustrated a frame member 5 of an automobile body to which is applied a covering 7 of relatively thin sheet metal. In the construction of these bodies there is usually a slight clearance or space as indicated at 9 between the frame member 5 and the covering 7 and in the application of fastener elements thereto when they are attached through the covering 7 and anchored to the frame member 5 I have found that the covering 7 is usually distorted and pressed down against the member 5 in the action of securing the fastener, marring the covering 7 and giving an unsightly appearance to the entire job.

In the drawing I have illustrated a turnbutton fastener such as is shown in my Patent No. 1,417,658, May 30, 1922, as applied with its base 11 resting against the covering 7. In the use of the fastener the grommet on the curtain or similar element to be secured embraces the base 11 and the head 12 is turned into traversing position to retain the grommet. To secure such fasteners in position on a wooden member such as the frame piece 7 a wood screw is an excellent expedient and herein a screw 13 is provided with a head 15 which fits the hollow sheet metal base 11 of the fastener, the marginal portions of which base embrace and are clinched around the head 15, the screw 13 projecting as a threaded shank permitting the entire fastener to be attached in position in the same manner as a screw is driven by the use of a suitable socket wrench fitting over the fastener base. In setting up a screw in this manner, however, the covering 7 would be pressed down by the base of the fastener into contact with the frame member 5 and I therefore provide suitable stop means for limiting the penetration of the screw so that the base of the fastener 11 will be spaced in determinate relation to the frame member 5. In the present embodiment of the invention wherein the fastener is provided with a central threaded shank permitting it to be screwed in as a whole this stop means is preferably organized coaxially with the screw to permit the screwing in action and herein a shoulder 17 is provided near the root of the screw 13 conveniently by forming the screw with a stepped head having a smaller portion providing the shoulder 17 and a larger portion 15 which is received in the hollow base of the fastener 11. The smaller portion projects through the covering 7 or sheet metal portion of the automobile body and the shoulder 17 as the screw is set up makes contact with the frame member 5 limiting the penetration of the screw and prevents the base of the fastener from pressing in on the covering 7 in such manner as to distort the covering and cause a visible or unsightly dent or depression therein.

As the space between the frame 5 and covering 7 may vary the hole in the latter which receives the secondary head or shoulder 17 may be drilled or otherwise formed and this hole may be made of uniform depth corresponding to the height of said shoulder and entering more or less the frame member 5 as indicated at 19 in the drawing. The penetration of the screw 13 is thus definitely limited by the contact of the shoulder with the bottom of the recess at a definite distance from the outer face of the covering 7.

Having thus described in detail the particular embodiment of my invention herein shown as illustrative of the principles thereof, what I claim as new and desire to secure by Letters Patent I shall express in the following claims.

1. In combination with a supporting element having a covering of sheet material, a separable fastener element applied to said covering, a securing means extending from said fastener element and anchored in said supporting element and associated spacing means passing through said covering and contacting with said supporting element.

2. In combination with a supporting element having a covering of sheet material, a separable fastener element applied to said covering, a securing screw extending therefrom and screwed into said supporting element and spacing means organized coaxially with the screw passing through said covering and contacting with said supporting element.

3. In combination with a supporting element having a covering of sheet material, a separable fastener element applied to said covering, a spacing means projecting from said element through said covering and seated in a recess in the supporting element and a screw also carried by said fastener element entering the base of the recess.

In testimony whereof, I have signed my name to this specification.

DAVID BOURQUE.